J. F. O'CONNOR.
GRAVITY SELF CENTERING ROLLER BEARING.
APPLICATION FILED MAR. 1, 1919. RENEWED MAY 26, 1920.

1,345,805.  
Patented July 6, 1920.  
2 SHEETS—SHEET 1.

WITNESSES:  
Wm. Geiger

INVENTOR.  
John F. O'Connor  
BY George J. Haight  
ATTORNEY

J. F. O'CONNOR.
GRAVITY SELF CENTERING ROLLER BEARING.
APPLICATION FILED MAR. 1, 1919. RENEWED MAY 26, 1920.
1,345,805.
Patented July 6, 1920.
2 SHEETS—SHEET 2.
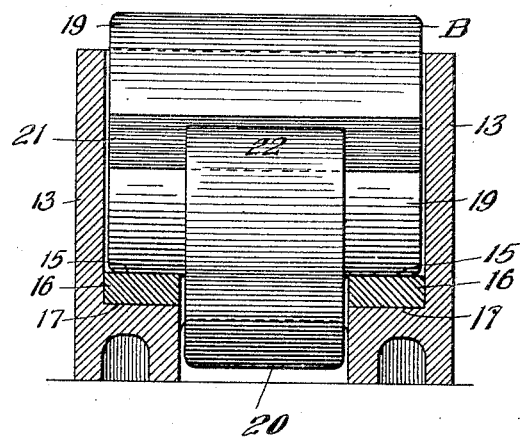
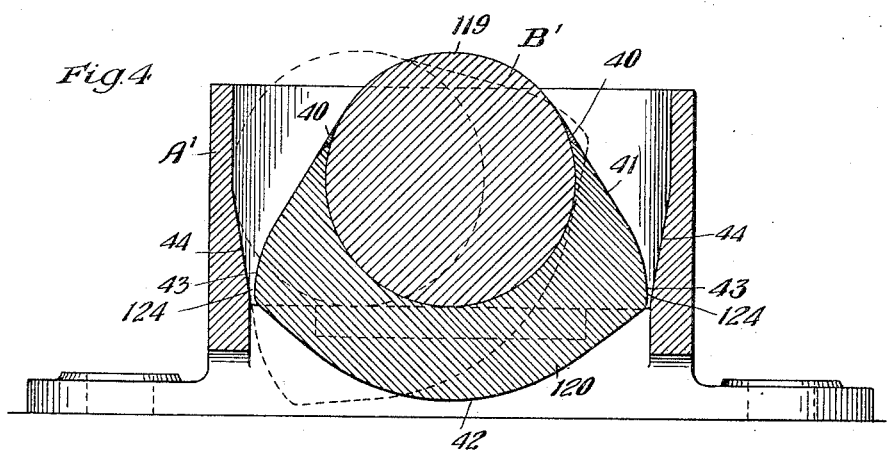
WITNESSES:
Wm. Geiger
INVENTOR.
John F. O'Connor
BY George J. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

GRAVITY SELF-CENTERING ROLLER-BEARING.

1,345,805.    Specification of Letters Patent.    Patented July 6, 1920.

Application filed March 1, 1919, Serial No. 279,939. Renewed May 26, 1920. Serial No. 384,509.

*To all whom it may concern:*

Be it known that I, JOHN F. O'CONNOR, a citizen of the United States, residing at Chicago, in the county of Cook and State of Illinois, have invented a certain new and useful Improvement in Gravity Self-Centering Roller-Bearings, of which the following is a full, clear, concise, and exact description, reference being had to the accompanying drawings, forming a part of this specification.

This invention relates to improvements in gravity self-centering roller bearings.

One object of the invention is to provide an improved roller bearing especially adapted for railway car side bearings and wherein is employed a minimum number of parts with a true anti-friction roller that is self-centering under the influence of gravity and without the aid of springs or other parts likely to get out of order. This invention is in the nature of an improvement on the device described and claimed in the co-pending George A. Johnson application No. 270,771, filed January 13, 1919, for improvement in gravity self-centering roller bearings.

More specifically, the object of the invention is to provide a roller bearing of the type shown in said Johnson application, wherein the process of manufacture is simplified, rendered less expensive and greater accuracy insured.

In said Johnson application, a self-centering roller bearing is disclosed, the drawings of said application showing an anti-friction element wherein the eccentric weight is formed integrally with the roller. In the present improvement, the eccentric weight is formed separate from the true cylindrical roller proper and is assembled with the latter to secure the same effect as is obtained with the bearing disclosed in said Johnson application.

Figure 1:
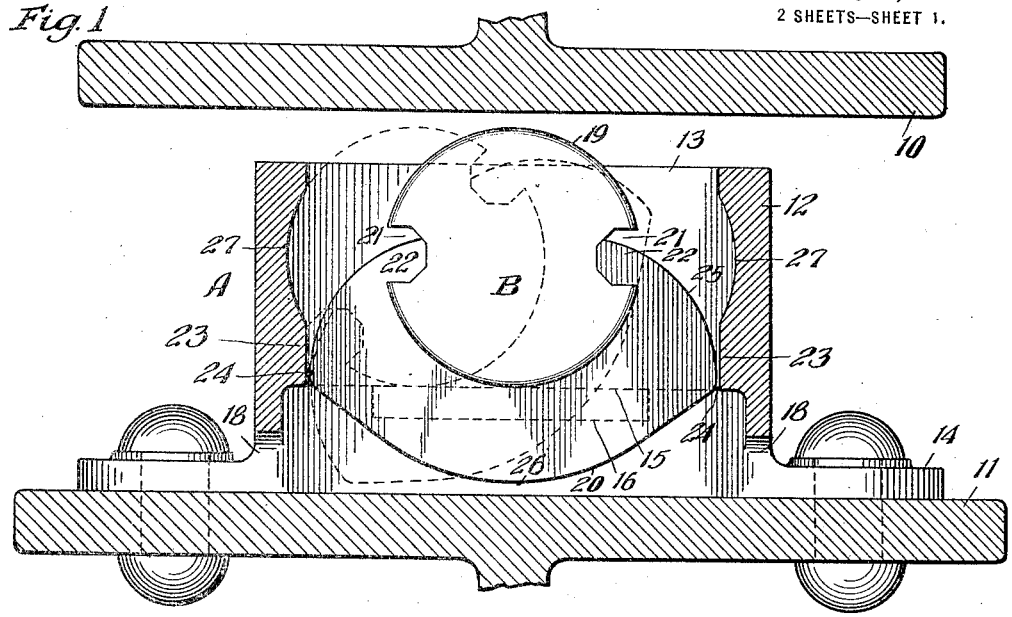
Figure 2:
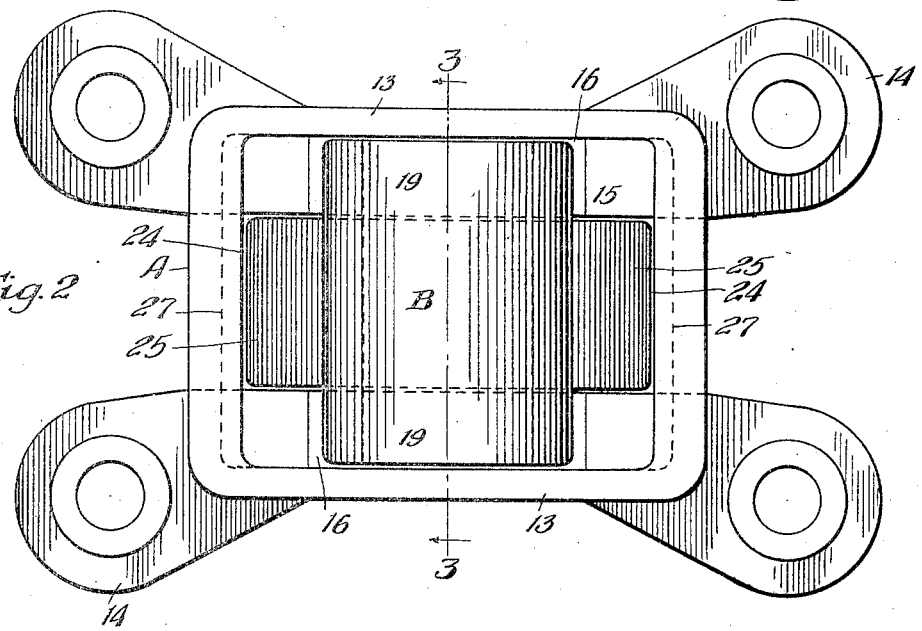

In the drawings forming a part of this specification, Figure 1 is a vertical sectional view taken through the ends of the body and truck bolsters of a car showing my improved bearing in connection therewith. In said figure, the retaining casting is shown in section and the anti-friction element in end elevation. Fig. 2 is a top plan view of the roller bearing shown in Fig. 1. Fig. 3 is a vertical transverse sectional view taken substantially on the line 3—3 of Fig. 2. Fig. 4 is a vertical sectional view taken centrally of the anti-friction elements and illustrating a different embodiment of my invention.

Referring first to the construction illustrated in Figs. 1, 2 and 3, 10 denotes the under portion of a body bolster of a car and 11 the upper portion of a corresponding opposed truck bolster. In the drawing, the side bearing is illustrated as secured to the truck bolster, and, as shown, the side bearing comprises, broadly, two elements, to-wit: a casing or retaining casting A and an anti-friction element B.

The casing or casting A is shown of substantially rectangular hollow formation having end walls 12—12, side walls 13—13 and perforated ears or lugs 14—14 at the corners of the casing by which the latter is adapted to be riveted or otherwise secured to the truck bolster. On its interior, the casing A is formed with a pair of parallelly arranged, laterally spaced, horizontally extending, flat bearings, as indicated at 15—15. In actual manufacture, these longitudinally extending bearings will preferably be provided by inserts 16—16 of suitable wear-resisting material, the inserts being supported by corresponding horizontal ledges 17—17 formed integrally in the casing A. At each end, the casing A is preferably cut away at the bottom, as indicated at 18—18, to readily permit cinders or other foreign matter to escape or be washed out from the interior of the casing.

The anti-friction element B, as shown, comprises a true cylindrical section 19 and a normally depending eccentrically disposed, separately formed, weighted section 20. The roller proper, 19, in actual manufacture, will be formed from high carbon rolled steel suitably tempered to provide the necessary wear-resisting qualities. The eccentric weighted section 20, in actual manufacture, will preferably be made of malleable or gray iron.

To permit the assembly of the true roller section 19 and weight 20, the roller section 19 will preferably be formed with diametrically disposed, longitudinally extending grooves, as indicated at 21—21. The weighted section 20 will be formed, at its upper portion, with correspondingly shaped, opposed inturned tongues 22—22, adapted to be slid longitudinally within the grooves 21 until the weighted section 20 is centrally disposed lengthwise of the roller section 19. The tongues 22 may be peened or hammered in position to more rigidly unite the parts, although it is evident that the weighted section 20 cannot become displaced after the parts have been assembled and the weighted section disposed between the two horizontally extending roller bearing seats, as indicated most clearly in Fig. 3.

On its interior, the casing A is formed with transversely extending shoulders at each end, as indicated at 23—23, and the maximum dimension of the weighted section 20, in a direction perpendicular to the axis of the roller, will be so made that only a slight clearance is normally left between said shoulders 23 and the adjacent portions of the weighted section, as indicated at 24—24. The object of this is to limit to a minimum the amount of bodily displacement of the anti-friction element B so as to positively insure the element B in suitable position under all conditions to permit a complete, or substantially complete, movement. The periphery of the weighted section 20 is specially formed, the upper portions 25 thereof being struck on radii of one length and the lower portion of the periphery, indicated at 26, being struck on a different length radius and concentric with the periphery of the roller proper 19. Above the transversely extending shoulders 23, the end walls of the casing A are undercut with concave surfaces, as indicated at 27—27. Said undercut surfaces 27 are so located and formed as to fit the periphery of the roller proper 19, when the latter is moved to either extreme position—one of which is indicated by the dotted lines in Fig. 1. As will be understood, particularly from the description of said Johnson application No. 270,771, to which reference is hereby specifically made, the periphery of the weighted section of the anti-friction element B is so designed as to positively clear the under faces of the end walls of the casing regardless of the direction in which the anti-friction element B is rotated from central normal position, and, at the same time, limit to a minimum, the possible offsetting of the element B occurring through wear or vibration.

Referring now to the construction illustrated in Fig. 4, the anti-friction element, as an entirety, is indicated by the reference B' and the casing or retaining casting by the reference A'. The anti-friction element B' is composed of two separate elements—that is, a true cylindrical roller 119 and an eccentrically disposed weighted section 120. As in the instance of the construction shown in Figs. 1, 2 and 3, the roller proper 119 will preferably be formed from high carbon rolled steel, suitably tempered, and the weighted section from malleable or gray iron. In the construction shown in Fig. 4, the weighted section is first slipped over the roller proper 119 and may then be welded or soldered to the roller proper, as indicated at 40—40.

The interior of the casing A' corresponds broadly to that of the casing A, particularly as regard the horizontal bearing seats, side walls and dirt-clearing openings. The periphery of the weighted section, however, is made slightly different, the upper portion thereof, as indicated at 41—41, being made substantially tangent to the periphery of the roller proper 119. The lower portion of the periphery of the weighted section 120, as indicated at 42, is made concentric with the surface of the roller proper 119, and the portions 41 and 42 of the periphery of the weighted section are bridged by peripheral surfaces, as indicated at 43—43, which are struck on comparatively short radii. In view of the peripheral formation of the weighted section 120, the interior faces of the end walls of the casing A' are correspondingly changed by providing them with upwardly and outwardly inclined faces 44—44, against which the tangential peripheral portions 41 of the weighted section are adapted to lie substantially flat when the element B' is moved to either extreme position, as shown, for instance, by the dotted line. As in the construction of Figs. 1, 2 and 3, the construction in Fig. 4 is so designed as to leave very slight spaces, as indicated at 124—124, between the end walls of the casing A' and adjacent portions of the weighted section 120, to thereby limit the bodily offsetting of the element B'.

With the construction above described, it is evident that the roller sections proper can be easily manufactured from rolled steel and great accuracy insured with respect to the cylindrical surface thereof. Also these roller sections proper can be made of any desired hardness, due to the fact that they can be tempered. The eccentric weighted sections can be made of the cheapest kind of castings, in large quantities, thereby reducing the initial cost, and, furthermore, the peripheries of the said weighted sections may be more readily ground or trued up to the requisite contour than is possible with those constructions where the weighted section is normally integral with the roller section proper.

Although I have herein shown and described what I now consider the preferred manner of carrying out my invention, the same is merely illustrative and I contemplate all changes and modifications that come within the scope of the claims appended hereto.

I claim:

1. In an anti-friction bearing of the character described, the combination with a hollow retaining member adapted to be secured to a bolster of a car and having a pair of parallelly arranged, spaced, flat, longitudinally extending bearing seats, of an anti-friction cylindrical roller having its ends adapted to roll along said seats, and an eccentrically disposed, separately formed, weight rigidly attached to said roller adapted to automatically return the latter to normal position after each actuation upon removal of the actuating pressure.

2. In an anti-friction bearing of the character described, the combination with a hollow retaining member having bearing seats, and walls extending transversely of said seats, of an anti-friction element disposed within said member and adapted for rolling movement along said seats, said element having a weighted section, said weighted section being of such dimension, in a line extending between said transverse walls of the retaining member, as to leave a relatively small space between said weighted section and said transversely extending walls to thereby limit the amount of off-center to which the anti-friction element can be accidentally brought to rest free from pressure, the weighted section and element being separately formed and rigidly united.

3. In an anti-friction bearing of the character described, the combination with a retaining member, of an anti-friction element, composed of one material, said member having a bearing seat horizontal throughout and on which said element bears and is adapted to roll to either side of normal position, said element having an eccentrically disposed weighted portion, separately formed of different material and rigid with respect thereto, said weighted portion being elevated when the element is rolled from its normal position in either direction and thereby adapted to roll said element in a return direction upon removal of the actuating force, said member having means on opposite sides of the element extending parallel thereto and slightly spaced from said weighted portion on each side of the element when the latter is in central normal position, said means coöperating with said weighted portion to limit the amount of off-center at which said element may come to rest when free from actuating force.

4. In an anti-friction bearing of the character described, the combination with a casing having a horizontal bearing seat, of an anti-friction element adapted to roll along said seat in either direction from normal and coöperating means on said element and said casing adapted to limit the amount of off-center of said element when the latter is free from actuating pressure, the portion of said means on the anti-friction element being formed separately from the remaining portion of said element and rigidly united thereto.

5. In an anti-friction bearing adapted for railway cars, the combination with a casing adapted to be secured to a bolster, of an anti-friction cylindrical roller disposed within said casing, the latter having a horizontally extending flat bearing surface upon which said roller is adapted to roll in either direction from normal position, said casing being provided with transversely extending interior shoulders at each end thereof on opposite sides of the roller, said roller having a separately formed eccentrically disposed weighted section of different material rigidly united thereto, said weighted section having its periphery formed with curved surfaces of different radii, the maximum dimension of said section, in a direction perpendicular to the axis of the roller, being slightly less than the distance between said ribs and substantially in line therewith.

In witness that I claim the foregoing I have hereunto subscribed my name this 19th day of Feb. 1919.

JOHN F. O'CONNOR.